US012809904B2

(12) United States Patent
VenkateshaMurthy et al.

(10) Patent No.: US 12,809,904 B2
(45) Date of Patent: Nov. 24, 2026

(54) MACHINE LEARNING-BASED TRAINING MANAGEMENT

(71) Applicant: Dell Products L.P., Round Rock, TX (US)

(72) Inventors: Girish VenkateshaMurthy, Bengaluru (IN); Ramesh Jampula, Hyderabad (IN); Navin Kumar Neithalath, Bangalore (IN); Venkata Nagendra Purushotham Musti, Hyderabad (IN); Hung Dinh, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 111 days.

(21) Appl. No.: 18/678,429

(22) Filed: May 30, 2024

(65) Prior Publication Data

US 2025/0371500 A1 Dec. 4, 2025

(51) Int. Cl.
*G06F 16/335* (2019.01)

(52) U.S. Cl.
CPC .................................. *G06F 16/335* (2019.01)

(58) Field of Classification Search
None
See application file for complete search history.

(56) References Cited

U.S. PATENT DOCUMENTS

2004/0002870 A1* 1/2004 Draper .................. G06Q 10/10 705/7.42
2010/0211924 A1* 8/2010 Begel .................... G06F 16/904 707/E17.069
2020/0034774 A1* 1/2020 Swanson .......... G06Q 10/06398
2023/0274654 A1* 8/2023 Yadkikar .............. G06V 30/413
2024/0330834 A1* 10/2024 Tiwari ............ G06Q 10/06398
(Continued)

OTHER PUBLICATIONS

World Economic Forum, "Reskilling Revolution: Preparing 1 Billion People for Tomorrow's Economy," https://www.weforum.org/impact/reskilling-revolution-reaching-600-million-people-by-2030/, Jan. 17, 2024, 18 pages.
(Continued)

*Primary Examiner* — James Trujillo
*Assistant Examiner* — John J Morris
(74) *Attorney, Agent, or Firm* — Ryan, Mason & Lewis, LLP

(57) ABSTRACT

An apparatus comprises at least one processing device configured to determine interdependencies between a first and one or more additional applications developed by a given entity and mappings between the first and one or more additional applications and a training hierarchy comprising a plurality of trainings. The at least one processing device is also configured to identify a given user role of a given user responsible for development of the first application, and to generate, utilizing one or more machine learning models that take as input the given user role, the determined interdependencies and the determined mappings, a training plan for the given user specifying trainings to be completed by the given user. The at least one processing device is further configured to track a progress of the training plan by the given user, and to dynamically update a user profile of the given user based on the tracked progress.

20 Claims, 11 Drawing Sheets

(56) References Cited

U.S. PATENT DOCUMENTS

2025/0063140 A1* 2/2025 Grillo .................... G06F 40/30

OTHER PUBLICATIONS

Microsoft, "What is SharePoint?" https://support.microsoft.com/en-us/office/what-is-sharepoint-97b915e6-651b-43b2-827d-fb25777f446f, Accessed Apr. 25, 2024, 4 pages.
Atlassian, "Confluence Basics," https://www.atlassian.com/software/confluence/resources/guides/get-started/overview#about-confluence, Accessed Apr. 25, 2024, 5 pages.
Udemy, "All the Skills You Need in One Place," https://www.udemy.com/, Accessed Apr. 25, 2024, 6 pages.
Skillshare, Inc, "Get Creative with Skillshare," https://www.skillshare.com/en/. Accessed Apr. 25, 2024, 5 pages.
Linkedin, "The Most Powerful Skills Development Platform," https://learning.linkedin.com/cx/get-started?src=go-pa&trk=sem-ga_campid.20913255533_asid.161076144847_crid.686759883335_kw.linkedin, Accessed Apr. 25, 2024, 5 pages.
Cornerstone, "Explore the LMS Evolving How We All Work," https://www.cornerstoneondemand.com/platform/learning-management-lms/?utm_campaign=LGEN_adwords-NA-LMS&utm_medium=cpc&ut%E2%80%A6=, Accessed Apr. 25, 2024, 13 pages.
Workday, "About Workday," Aug. 2015, 5 pages.
F.-F. Li et al., "Cloud AutoML: Making AI Accessible to Every Business," https://blog.google/products/google-cloud/cloud-automl-making-ai-accessible-every-business/, Jan. 17, 2018, 4 pages.

* cited by examiner

650

| INPUT | OUTPUT |
|---|---|
| PRODUCT TEAM: PT1<br><br>ROLE: MANAGER | EXP1 – 101<br>EXP1 \| PL1 – 101<br>EXP1 \| PL1 \| PT1 – 101<br>+<br>EXP1 \| PL2 – 101<br>+<br>EXP2 – 101<br>EXP3 – 101 |
| PRODUCT TEAM: PT1<br><br>ROLE: DEVELOPER | EXP1 – 101<br>EXP1 \| PL1 – 101<br>EXP1 \| PL1 – 201<br>EXP1 \| PL1 \| PT1 – 101<br>EXP1 \| PL1 \| PT1 – 201<br>EXP1 \| PL1 \| PT1 – 301<br>+<br>EXP1 \| PL2 – 101<br>EXP1 \| PL2 \| PT2 – 101<br>+<br>EXP2 – 101<br>EXP3 – 101 |

FIG. 6B

705

| TEAM: PT112<br>ROLE: MANAGER | TEAM: PT112<br>ROLE: ARCHITECT | TEAM: PT112<br>ROLE: DEVELOPER |
|---|---|---|
| EX1-101<br>PL11-101<br>PT112-101<br>+<br>PT111-101<br>+<br>PL12-101<br>PT121-101<br>+<br>EX2-101<br>PL22-101<br>PT221-101 | EX1-101<br>PL11-101<br>PL11-201<br>PT112-101<br>PT112-201<br>+<br>PT111-101<br>PT111-201<br>+<br>PL12-101<br>PT121-101<br>+<br>EX2-101<br>PL22-101<br>PT221-101 | EX1-101<br>PL11-101<br>PL11-201<br>PT112-101<br>PT112-201<br>PT112-301-1<br>PT112-301-2<br>+<br>PT111-101<br>PT111-201<br>+<br>PL12-101<br>PT121-101<br>+<br>EX2-101<br>PL22-101<br>PT221-101 |

FIG. 7B

MACHINE LEARNING-BASED TRAINING MANAGEMENT

BACKGROUND

As the value and use of information continues to increase, individuals and businesses seek additional ways to process and store information. Information processing systems may be used to process, compile, store and communicate various types of information. Because technology and information processing needs and requirements vary between different users or applications, information processing systems may also vary (e.g., in what information is processed, how the information is processed, how much information is processed, stored, or communicated, how quickly and efficiently the information may be processed, stored, or communicated, etc.). Information processing systems may be configured as general purpose, or as special purpose configured for one or more specific users or use cases (e.g., financial transaction processing, airline reservations, enterprise data storage, global communications, etc.). Information processing systems may include a variety of hardware and software components that may be configured to process, store, and communicate information and may include one or more computer systems, data storage systems, and networking systems.

SUMMARY

Illustrative embodiments of the present disclosure provide techniques for machine learning-based training management.

In one embodiment, an apparatus comprises at least one processing device comprising a processor coupled to a memory. The at least one processing device is configured to generate a first data structure characterizing interdependencies between a first and one or more additional applications developed by a given entity, to generate a second data structure characterizing mappings between the first and one or more additional applications and a training hierarchy comprising a plurality of trainings, and to identify a given user that is part of a group of two or more users responsible for development of the first application, the given user being associated with a given user role within the group of two or more users. The at least one processing device is also configured to generate, utilizing one or more machine learning models that take as input the given user role of the given user and at least portions of the first data structure and the second data structure, a training plan for the given user, the training plan specifying a subset of the plurality of trainings to be completed by the given user. The at least one processing device is further configured to track a progress of the given user for different ones of the subset of the plurality of trainings included in the generated training plan, and to dynamically update a user profile associated with the given user based at least in part on the tracked progress of the given user.

These and other illustrative embodiments include, without limitation, methods, apparatus, networks, systems and processor-readable storage media.

BRIEF DESCRIPTION OF THE DRAWINGS

FIGS. 6A and 6B show a system flow for generating training recommendations in an illustrative embodiment.

FIGS. 7A and 7B show a mapping of trainings to a product hierarchy and training recommendations for different roles associated with a product team in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
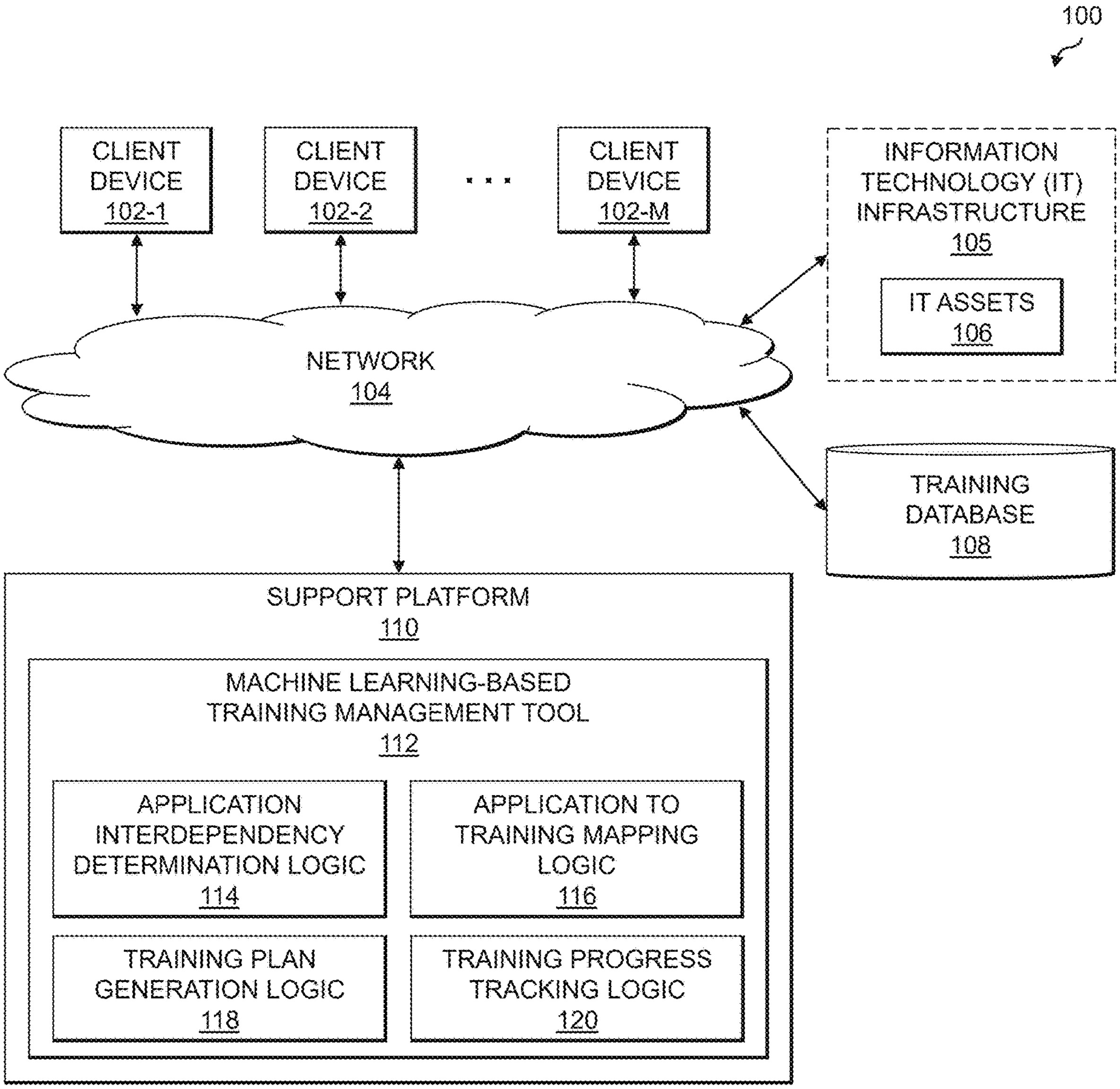
FIG. 1 is a block diagram of an information processing system configured for machine learning-based training management in an illustrative embodiment.

FIG. 1 shows an information processing system 100 configured in accordance with an illustrative embodiment. The information processing system 100 is assumed to be built on at least one processing platform and provides functionality for machine learning-based training management. The information processing system 100 includes a set of client devices 102-1, 102-2, . . . 102-M (collectively, client devices 102) which are coupled to a network 104. Also coupled to the network 104 is an IT infrastructure 105 comprising one or more IT assets 106, a training database 108, and a support platform 110. The IT assets 106 may comprise physical and/or virtual computing resources in the IT infrastructure 105. Physical computing resources may include physical hardware such as servers, storage systems, networking equipment, Internet of Things (IoT) devices, other types of processing and computing devices including desktops, laptops, tablets, smartphones, etc. Virtual computing resources may include virtual machines (VMs), containers, etc.

In some embodiments, the support platform 110 is used for an enterprise system. For example, an enterprise may subscribe to or otherwise utilize the support platform 110 for managing training for users (e.g., of client devices 102) of an enterprise, organization or other entity. As used herein, the term "enterprise system" is intended to be construed broadly to include any group of systems or other computing devices. For example, the IT assets 106 of the IT infrastructure 105 may provide a portion of one or more enterprise systems. A given enterprise system may also or alternatively include one or more of the client devices 102. In some embodiments, an enterprise system includes one or more data centers, cloud infrastructure comprising one or more clouds, etc. A given enterprise system, such as cloud infrastructure, may host assets that are associated with multiple enterprises (e.g., two or more different businesses, organizations or other entities).

The client devices 102 may comprise, for example, physical computing devices such as IoT devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 102 may also or alternately comprise virtualized computing resources, such as VMs, containers, etc.

The client devices 102 in some embodiments comprise respective computers associated with a particular company, organization or other enterprise. Thus, the client devices 102 may be considered examples of assets of an enterprise system. In addition, at least portions of the information processing system 100 may also be referred to herein as collectively comprising one or more "enterprises." Numerous other operating scenarios involving a wide variety of different types and arrangements of processing nodes are possible, as will be appreciated by those skilled in the art.

The network 104 is assumed to comprise a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks.

The training database 108 is configured to store and record various information that is utilized by the support platform 110. Such information may include, for example, training plans, talent profiles, data related to available trainings, product taxonomies, training mandates, reporting hierarchy and user roles, incidents data, product dependencies, etc. The training database 108 may be implemented utilizing one or more storage systems. The term "storage system" as used herein is intended to be broadly construed. A given storage system, as the term is broadly used herein, can comprise, for example, content addressable storage, flash-based storage, network-attached storage (NAS), storage area networks (SANs), direct-attached storage (DAS) and distributed DAS, as well as combinations of these and other storage types, including software-defined storage. Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the support platform 110, as well as to support communication between the support platform 110 and other related systems and devices not explicitly shown.

The support platform 110 may be provided as a cloud service that is accessible by one or more of the client devices 102 to allow users thereof to manage training plans and monitor training progress for different users of an enterprise, organization or other entity. In some embodiments, the client devices 102 are assumed to be associated with system administrators, IT managers or other authorized personnel responsible for managing one or more product teams or other groups of users of an enterprise, organization or other entity. In some embodiments, the client devices 102 are utilized by members of the same enterprise, organization or other entity that operates the support platform 110. In other embodiments, the client devices 102 are utilized by members of one or more enterprises, organizations or other entities different than the enterprise, organization or other entity that operates the support platform 110 (e.g., a first enterprise provides support functionality for multiple different customers, businesses, etc.). Various other examples are possible.

In some embodiments, the client devices 102 and/or the IT assets 106 of the IT infrastructure 105 may implement host agents that are configured for automated transmission of information with the training database 108 and the support platform 110 regarding training of users of an enterprise, organization or other entity. It should be noted that a "host agent" as this term is generally used herein may comprise an automated entity, such as a software entity running on a processing device. Accordingly, a host agent need not be a human entity.

The support platform 110 in the FIG. 1 embodiment is assumed to be implemented using at least one processing device. Each such processing device generally comprises at least one processor and an associated memory, and implements one or more functional modules or logic for controlling certain features of the support platform 110. In the FIG. 1 embodiment, the support platform 110 implements a machine learning-based training management tool 112 (also referred to as a training management tool 112). The training management tool 112 comprises application interdependency determination logic 114, application to training mapping logic 116, training plan generation logic 118 and training progress tracking logic 120. The application interdependency determination logic 114 is configured to determine interdependencies between different applications (e.g., software products) that are developed by a given entity. The application to training mapping logic 116 is configured to determine mappings between the applications and a training hierarchy comprising a plurality of trainings. The training plan generation logic 118 is configured to identify a given user that is part of a group of two or more users responsible for development of a given application, the given user being associated with a given user role within the group of two or more users. The training plan generation logic 118 is also configured to generate, utilizing one or more machine learning models that take as input the given user role of the given user, the determined application interdependencies, and the determined application to training hierarchy mappings, a training plan for the given user, the training plan specifying a subset of the plurality of trainings to be completed by the given user. The training progress tracking logic 120 is configured to track a progress of the given user for different ones of the subset of the plurality of trainings included in the generated training plan, and to dynamically update a user profile associated with the given user based at least in part on the tracked progress of the given user.

At least portions of the training management tool 112, the application interdependency determination logic 114, the application to training mapping logic 116, the training plan generation logic 118 and the training progress tracking logic 120 may be implemented at least in part in the form of software that is stored in memory and executed by a processor.

It is to be appreciated that the particular arrangement of the client devices 102, the IT infrastructure 105, the training database 108 and the support platform 110 illustrated in the FIG. 1 embodiment is presented by way of example only, and alternative arrangements can be used in other embodiments. As discussed above, for example, the support platform 110 (or portions of components thereof, such as one or more of the training management tool 112, the application interdependency determination logic 114, the application to training mapping logic 116, the training plan generation logic 118 and the training progress tracking logic 120) may in some embodiments be implemented internal to the IT infrastructure 105.

The support platform 110 and other portions of the information processing system 100, as will be described in further detail below, may be part of cloud infrastructure.

The support platform 110 and other components of the information processing system 100 in the FIG. 1 embodiment are assumed to be implemented using at least one processing platform comprising one or more processing devices each having a processor coupled to a memory. Such processing devices can illustratively include particular arrangements of compute, storage and network resources.

The client devices 102, IT infrastructure 105, the IT assets 106, the training database 108 and the support platform 110 or components thereof (e.g., the training management tool 112, the application interdependency determination logic 114, the application to training mapping logic 116, the training plan generation logic 118 and the training progress tracking logic 120) may be implemented on respective distinct processing platforms, although numerous other arrangements are possible. For example, in some embodiments at least portions of the support platform 110 and one or more of the client devices 102, the IT infrastructure 105, the IT assets 106 and/or the training database 108 are implemented on the same processing platform. A given client device (e.g., 102-1) can therefore be implemented at least in part within at least one processing platform that implements at least a portion of the support platform 110.

The term "processing platform" as used herein is intended to be broadly construed so as to encompass, by way of illustration and without limitation, multiple sets of processing devices and associated storage systems that are configured to communicate over one or more networks. For example, distributed implementations of the information processing system 100 are possible, in which certain components of the system reside in one data center in a first geographic location while other components of the system reside in one or more other data centers in one or more other geographic locations that are potentially remote from the first geographic location. Thus, it is possible in some implementations of the information processing system 100 for the client devices 102, the IT infrastructure 105, IT assets 106, the training database 108 and the support platform 110, or portions or components thereof, to reside in different data centers. Numerous other distributed implementations are possible. The support platform 110 can also be implemented in a distributed manner across multiple data centers.

Additional examples of processing platforms utilized to implement the support platform 110 and other components of the information processing system 100 in illustrative embodiments will be described in more detail below in conjunction with FIGS. 8 and 9.

It is to be understood that the particular set of elements shown in FIG. 1 for machine learning-based training management is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

An exemplary process for machine learning-based training management will now be described in more detail with reference to the flow diagram of FIG. 2. It is to be understood that this particular process is only an example, and that additional or alternative processes for machine learning-based training management may be used in other embodiments.

In this embodiment, the process includes steps 200 through 210. These steps are assumed to be performed by the support platform 110 utilizing the training management tool 112, the application interdependency determination logic 114, the application to training mapping logic 116, the training plan generation logic 118 and the training progress tracking logic 120. The process begins with step 200, generating a first data structure characterizing interdependencies between a first and one or more additional applications developed by a given entity. In step 202, a second data structure is generated, the second data structure characterizing mappings between the first and one or more additional applications and a training hierarchy comprising a plurality of trainings. A given user that is part of a group of two or more users responsible for development of the first application is identified in step 204. The given user is associated with a given user role within the group of two or more users. In step 206, a training plan for the given user is generated utilizing one or more machine learning models that take as input the given user role of the given user and at least portions of the first data structure and the second data structure. The training plan specifies a subset of the plurality of trainings to be completed by the given user. A progress of the given user for different ones of the subset of the plurality of trainings included in the generated training plan is tracked is tracked in step 208, and a user profile associated with the given used is dynamically updated based at least in part on the tracked progress of the given user in step 210.

The training hierarchy may be organized into two or more levels, the two or more levels comprising: a first level for technology domains; a second level for groups of applications within each of the technology domains, and a third level for ones of the first and one or more additional applications within each of the groups of applications. Generating the training plan for the given user in step 206 comprises selecting, for each of the first application and the one or more additional applications, at least one training in the first level, at least one training in the second level and at least one training in the third level.

Generating the training plan for the given user in step 206 is further based at least in part on one or more initiatives of the given entity. The one or more initiatives of the given entity may be determined based at least in part utilizing a large language model that takes as input a textual description of the one or more initiatives of the given entity and the plurality of available trainings. Generating the training plan for the given user in step 206 may also or alternatively be based at least in part on one or more training mandates associated with at least one of the given entity and the given user role.

In some embodiments, the training hierarchy comprises two or more levels, and the selected subset of the plurality of trainings in the generated training plan comprises (i) a first set of one or more trainings selected from a first set of the two or more levels which are mapped to the first application and (ii) a second set of trainings selected from a second set of the two or more levels which are mapped to the one or more additional applications having interdependencies with the first application, the second set of the two or more levels being less than the first set of two or more levels.

It should be noted that the term "data structure" as used herein is intended to be broadly construed. A data structure, such as any single one of or combination of the first and second data structures referred to above, may provide a portion of a larger data structure, or any one of or combination of the first and second data structures may be combinations of multiple smaller data structures. Therefore, the first and second data structures referred to above may be different parts of a same overall data structure, or one or more of the first and second data structures could be made up of multiple smaller data structures. The data structures may include tables, vectors, embeddings, or various other data structures. In some embodiments, the data structures are specifically formatted or generated such that they are suitable for use as at least one of an input to and an output from a machine learning model.

Figure 2:
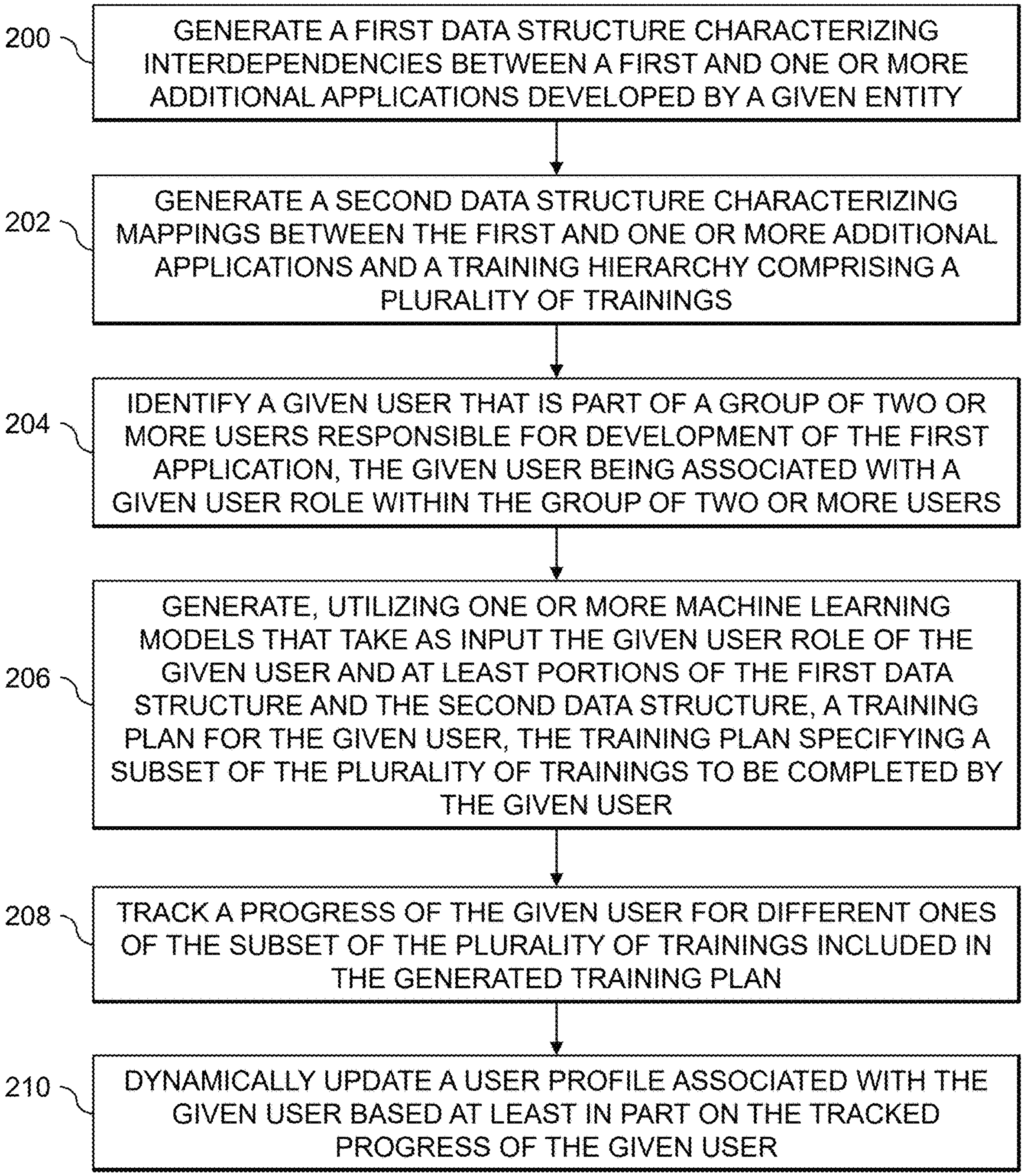
FIG. 2 is a flow diagram of an exemplary process for machine learning-based training management in an illustrative embodiment.

The FIG. 2 process may further include determining one or more skill gaps of the given user based at least in part on monitoring incident data associated with the first application and the given user, and generating the training plan for the given user in step 206 may be further based at least in part on the determined one or more skill gaps of the given user. Monitoring the incident data associated with the first application and the given user may be based at least in part on utilizing a natural language processing machine learning model to determine a mapping between textual descriptions of the incident data and one or more of the plurality of available trainings.

In some embodiments, the FIG. 2 process also includes determining a balance of two or more different types of skills for a plurality of users associated with the given entity, and generating the training plan for the given user in step 206 is further based at least in part on the determined balance of the two or more different types of skills for the plurality of users associated with the given entity.

Dynamically updating the user profile of the given user in step 210 may be further based at least in part on user feedback of one or more additional users associated with the given entity responsible for managing the given user, monitoring incident data associated with the first application and the given user subsequent to completion of different ones of the subset of the plurality of trainings included in the generated training plan by the given user, tracking a number of defects associated with the first application, and/or tracking a delivery time for code updates to the given application authored by the given user.

The particular processing operations and other system functionality described in conjunction with the flow diagram of FIG. 2 are presented by way of illustrative example only, and should not be construed as limiting the scope of the disclosure in any way. Alternative embodiments can use other types of processing operations. For example, as indicated above, the ordering of the process steps may be varied in other embodiments, or certain steps may be performed at least in part concurrently with one another rather than serially. Also, one or more of the process steps may be repeated periodically, multiple instances of the process can be performed in parallel with one another, etc.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

According to some estimates, more than a billion jobs are likely to be radically transformed by technology in the next decade. Reskilling and/or upskilling of employees or other users is thus a core responsibility for enterprises, organizations or other entities to create efficient, skilled and motivated work forces. This helps enterprises, organizations and other entities to stay competitive in the marketplace, and to keep up pace with constant and significant technological innovations and moon-shot goals. An enterprise, organization or other entity may utilize various strategies and tools to achieve these objectives. In some approaches, in-classroom and live online training sessions are utilized. Recorded training sessions are now gaining prominence due to their scalability and flexibility.

There are various online learning platforms available for users, including platforms such as Udemy, Skillshare, LinkedIn Learning, etc. In organizational settings, there are various role-based proprietary and bespoke training and learning tools (e.g., SABA) that may be used. In addition to these approaches, some enterprises, organizations of other entities with numerous teams have specialized pockets of training tailored to different business units or other groups, and may utilize various collaboration tools (e.g., Confluence, SharePoint, Box, etc.). A consistent and recurring theme among these various training methods is to comprehensively cover the knowledge and skills that are essential for employees or other members of an enterprise, organization or other entity to perform their activities efficiently and effectively.

Despite the plethora of training options available, there are still certain gaps when it comes to identifying the most suitable training for an employee or other user in a specific role. Most trainings which are assigned are related to technical, compliance (e.g., Prevention of Sexual Harassment (POSH), Green/Yellow belt, etc.) or soft skills (e.g., assertive, presentation, etc.), and are derived based on business needs, project needs or other entity objectives. Further, trainings are usually assigned with a top-down approach to upskill and/or reskill users. There is no definitive or one-size-fits-all solution available that leverages data (e.g., past performance of a user, "north star" vision, an entity's strategy and focus areas, etc.) to identify relevant training.

While developing inter- and intra-department bootcamp training charters, most often there is no dynamic recommendation of dependency modules, especially in product model scenarios. Users must understand the entity, data flow and communication amongst applications across domains, experiences, product lines and products. Understanding the interconnections between various applications and domains will empower team members or other users across roles to develop appropriate entity processes, identify gaps, enhance their technical knowledge and create automation solutions.

Illustrative embodiments provide technical solutions for learning tools (e.g., the training management tool 112) that bring intelligence to learning and training processes within an enterprise, organization or other entity. The technical solutions are thus able to provide various technical advantages relative to conventional approaches as described elsewhere herein.

User training may involve various different categories of learning, including technical skills, soft skills, functional skills, mandated training, team-specific training, etc. Technical skills are skills that are required for a team member to do their job or other tasks. For example, technical skills may be associated with programming languages, databases, developing microservices, etc. Training courses for technical skills are generic. Soft skills include intra- and interpersonal skills which enable team members to operate effectively in collaborative environments, and which allow for building the right operating environment. Soft skills may include, for example, presentation skills, teamwork, inclusivity, etc. Functional skills cover the functional aspects of a given domain and its functions. For example, different domains may include inventory, supply chain, customer relationship management, etc. These will be a combination of content on common functional concepts along with enterprise relevancy. Frequently, functional concepts can be derived from generic content, while entity-specific modifications are considered proprietary and require internally created and managed training content. Mandated training includes training mandated by corporate or entity policies, government compliance, company or other entity-wide initiatives, etc. Mandated training may include, for example, POSH, product methodology training, Green/Yellow belt, etc. Team-specific training includes training to enable new team members to understand the inside workings of applications or services that a team supports. Team-specific training may cover architecture, implementation, integration details, etc.

An enterprise, organization or other entity may employ diverse learning platforms and tools to address training requirements. Such learning platforms and tools encompass online learning portals, learning management systems, and custom learning portals. None of these platforms and tools, however, offer the capabilities for a data-driven approach to identify areas of improvement for all users, even beyond their immediate responsibilities. This allows entities to understand the impact of training on user performance and productivity. Additionally, the technical solutions described herein can be used to provide personalized training recommendations based on each user's unique requirements. Further, the technical solutions described herein are able to identify training topics beyond an individual user's immediate scope of responsibilities. The technical solutions described herein can integrate with other systems (e.g., human resources (HR) systems), making it easier to gather and analyze data from various sources. This integrated approach supports a data-driven approach, and helps to pinpoint areas for improvement and enables tailored training recommendations.

Conventional approaches suffer from various technical challenges, including technical challenges related to perception and interest-driven training, tracking training effectiveness, siloed and common specialized training, and a lack of dynamic learning paths and tracking of the same. In conventional approaches, the learning and eventual training needs are identified based on factors such as: a manager's perception of areas of opportunity for a given resource, a team-wide upskilling program that is applicable to all relevant team members, and areas of personal interest for individuals. Owing to the absence of data-backed decision-making, such perception and interest-driven training may result in certain topics being redundant while other topics might be overlooked entirely or not be given sufficient focus. After a training module is completed, evaluations may be conducted to assess individual learning and they are often easy to pass. However, the actual effectiveness of the training is better gauged by observing the performance of team members following the training session. Unfortunately, these crucial insights are currently absent in conventional approaches.

Each product team will have unique training requirements determined by the applications or services they support. However, these training courses often have a limited focus, catering solely to their specific scope of work. Consequently, team members might lack awareness or understanding of how their applications or services interact with others to carry out essential business functions. In conventional approaches, this crucial aspect is overlooked in the planning process, creating challenges for collaboration across teams.

Numerous learning platforms and tools may be employed to cater to various aspects of a team's learning requirements. However, there are often redundant capabilities and learning topics present across the different platforms and tools. As a result, creating a unified learning path independent of the underlying platforms and tools utilized becomes challenging. In conventional approaches, there is no efficient way to continually assess the effectiveness of the learning path in response to changing circumstances, such as shifts in North star goals, roadmap programs, etc.

Figure 3:
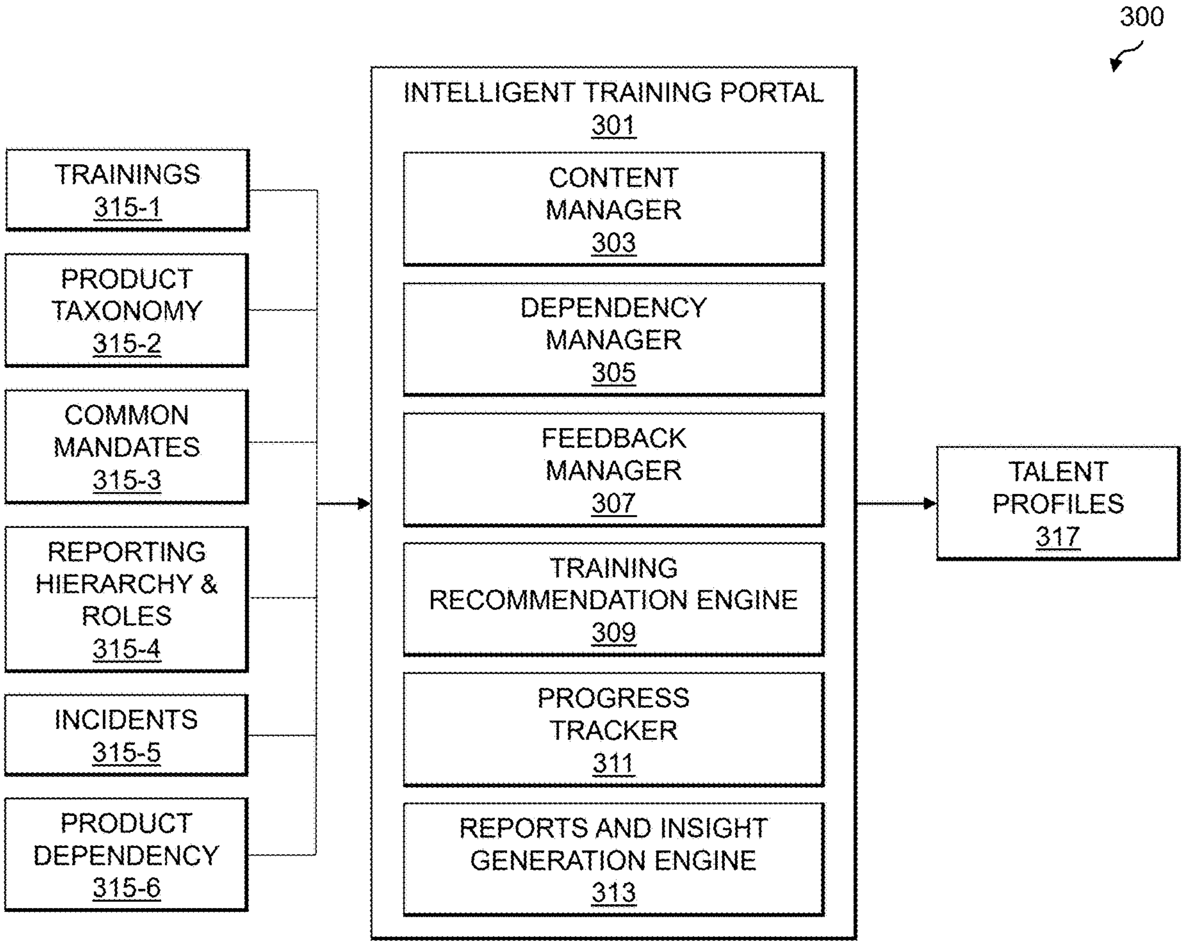
FIG. 3 shows a system configured to implement an intelligent training portal in an illustrative embodiment.

FIG. 3 shows a system 300 implementing an intelligent training portal 301. The intelligent training portal 301 implements a content manager 303, a dependency manager 305, a feedback manager 307, a training recommendation engine 309, a progress tracker 311, and a reports and insight generation engine 313. The intelligent training portal 301 takes inputs from various data sources, including a trainings data source 315-1 (e.g., SABA, custom portals, etc.), a product taxonomy data source 315-2, a common mandates data source 315-3 (e.g., security, innovation, etc.), a reporting hierarchy and roles data source 315-4 (e.g., Workday), an incidents data source 315-5 (e.g., ServiceNow), and a product dependency data source 315-6 (e.g., custom APIs). The data sources 315-1 through 315-6 are collectively referred to as data sources 315. The intelligent training portal 301 is configured to update talent profiles 317 (e.g., Workday) for different users as discussed in further detail below.

The intelligent training portal 301 provides various capabilities and outcomes, including: the ability to create and maintain a consolidated, role-based product team wise learning path across learning platforms, which makes it easier for team members to consume the right learning content; data-driven identification of training needs intelligently to make the learning more effective; real-time tracking of the effectiveness of the training content instead of depending only on user feedback, which improves the overall training effectiveness; providing holistic learning which involves not only focusing on immediate responsibilities but also understanding the interlocking products/applications, which breaks knowledge silos and fosters the creation of frictionless products; providing managers with feedback on the performance of their direct reports, identifying their relevant training needs, tracking progress on those training courses, and assessing their impact; and providing competency mapping, where HR or other systems often contain valuable data related to employee competencies and skills, with the intelligent training portal 301 integrating with such systems to map specific training modules, relevant topics or courses to required competencies, making it easier to design targeted and relevant training programs aligned with organizational goals; etc.

The intelligent training portal 301 provides a platform where training plans can be created dynamically for various roles and for specific teams. The content manager 303 provides functionality for referencing the available training (e.g., as determined via training information obtained via the trainings data source 315-1) across various levels (e.g., in a product hierarchy) and across roles for specific needs by annotating them using tags. Trainings can be derived from: standard training courses available in commercial learning portals; custom courses developed with an enterprise, organization or other entity Learning Management System (LMS) platform; courses created and managed by individual teams to meet their technical and functional needs; etc. The content manager 303 is configured to add tags to each identified training to uniquely mark various aspects for that training, such as the topic, training levels, intended role, etc. These tags are then leveraged to map the trainings to team members based on the role they play in a specific team. To help with administering the tagging process, the content manager 303 is configured to utilize previous tagging data to determine suitable tagging when new trainings are being registered with the intelligent training portal 301. Administrators can then review these tags and edit/approve as required.

The content manager 303 is configured to automate tagging processing using predictive topic tagging, where a model (e.g., a machine learning model) is trained using images, online text, documents, videos, etc. to classify content. For video-based training courses, content will be classified by object detection using Computer Vision (CV) tools (e.g., OpenCV), where objects are detected and classified to make intelligent decisions on the content (e.g., images, videos, etc.) tagging. For document-based content, natural language processing (NLP) and machine learning algorithms may be used to extract key words, phrases and topics (e.g., topic extraction) from the content, which are then used in tasks such as topic modeling, named entity recognition, sentiment analysis, categorization, etc. In some embodiments, Google Cloud AutoML is leveraged to automate the content tagging process across different media.

Figure 4:
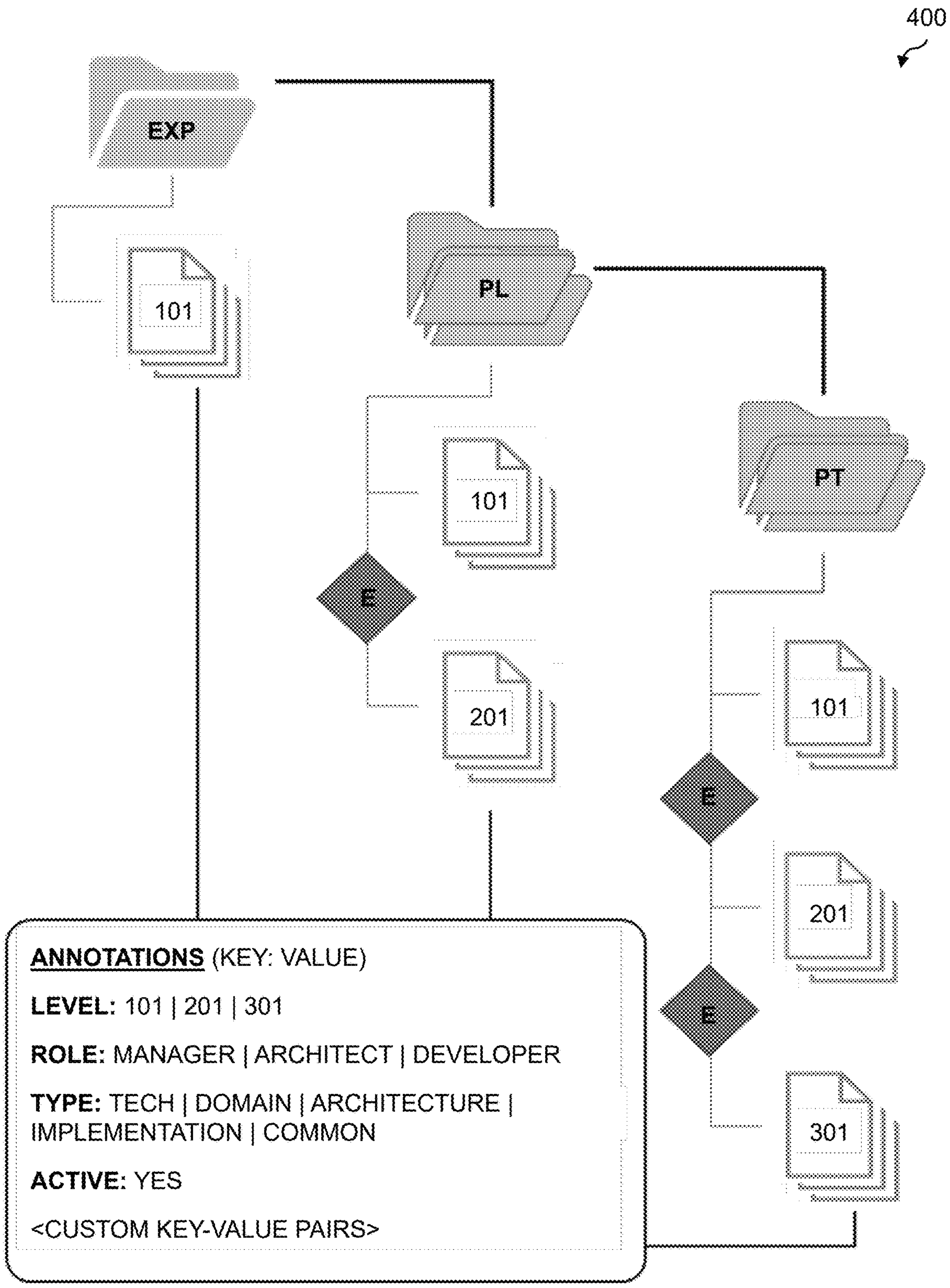
FIG. 4 shows a mapping of trainings to a product hierarchy in an illustrative embodiment.

FIG. 4 shows a mapping 400 of trainings to a product hierarchy and associated metadata tagging. A product may be fully owned or managed by a product team throughout its lifecycle (e.g., charter, roadmap, architecture, design, development, testing, delivery and operations). Product teams are autonomous and able to make decisions on behalf of the product. In some cases, a product team size is in the range of 6-10. Some key roles for a product team include product manager, product designer, and product engineers. Various specialist roles may be added as required. Products may be arranged in a hierarchy also referred to as a product taxonomy. The product taxonomy may include domains, experiences, product lines, and products. A domain is an overarching functional area that contains the experiences necessary to deliver a business function. Domains serve as logical groupings, and do not affect product management or strategy of individual experiences for day-to-day operations. An experience (EXP) is a logical grouping of product lines that enables an end-to-end user outcome. An experience may be accessed via a user interface (UI) or purpose-specific APIs. A product line (PL) is a logical grouping of related products that delivers a cohesive business and/or user capability. A product team (PT) manages a product which is independently deployable, but may have dependencies on other independent products to achieve an end-to-end business outcome. A product may have published methods of access, such as one or more APIs, messaging, and/or a UI. A product includes one of more functionally-related applications, services, and data sources. A product may have the following tents: a product is software or a service that solves for customer/user need or problem; a product has well-defined capabilities; and a product is durable. As shown in the mapping 400 of FIG. 4, trainings are organized in different levels (e.g., 101, 201, 301, etc.), roles (e.g., manager, architect, developer, etc.), types (e.g., tech, domain, architecture, implementation, common, etc.), active/inactive, etc. using various key: value pair annotations. In the mapping 400, the product hierarchy includes an experience EXP, a product line PL and a product team PT managing a product. As illustrated, the trainings for each product in each level extend one another (e.g., level 201 is an extension of level 101 for PL, level 301 is an extension of level 201 which is an extension of level 101 for PT, etc.).

Applications within an enterprise, organization or other entity do not function in isolation. Applications will invariably interact with multiple other applications. Given this interconnectedness, it is important that the teams responsible for developing and managing applications also avoid operating in isolation. In conventional approaches, however, this is the case and LMS platforms lack support for creating interdependent learning paths. The intelligent training portal 301 implements the dependency manager 305 to address these and other technical challenges. The dependency manager 305 is configured to determine and develop interlocks between applications, where it is important for team members to have knowledge of those applications and their characteristics (e.g., technology, feature set, architecture, boundaries, etc.). This empowers users to design and develop their applications with greater flexibility to accommodate the needs of other (related or interlocking) applications. This fosters frictionless application interlocks by integrating knowledge of interlocking applications into individual training plans.

Figure 5:
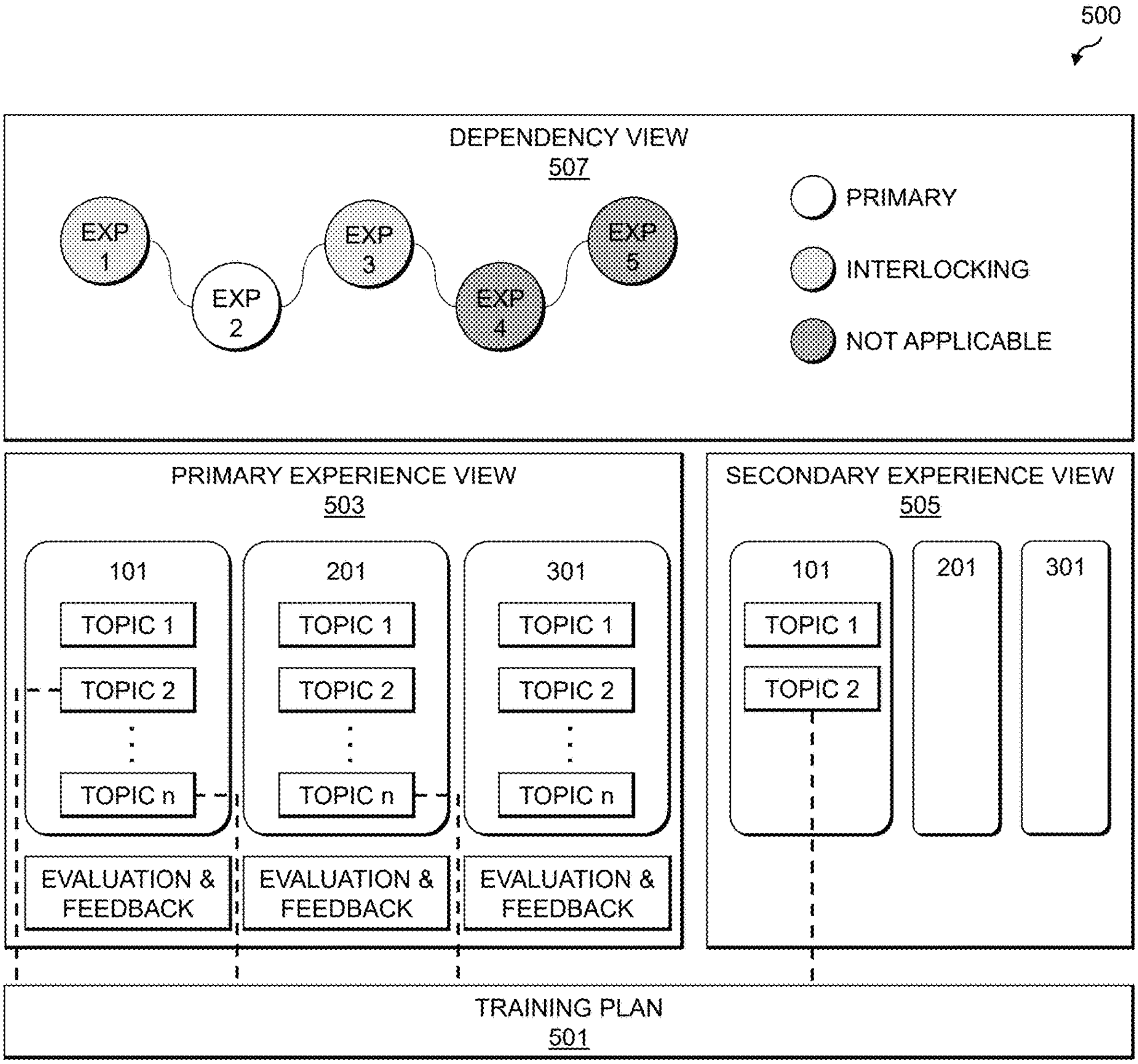
FIG. 5 shows primary, secondary and dependency views of a training plan in an illustrative embodiment.

FIG. 5 shows a visualization 500 of a training plan 501, including a primary experience view 503 and a secondary experience view 505. In this example, as shown in the dependency view 507, if team members belong to the experience EXP2, and this experience interlocks with experience EXP1 and experience EXP3, then such team members will not just undergo training relevant to their experience (e.g., EXP2) but will also do some trainings from the interlocking experiences EXP1 and EXP3. The difference here is that they will have to undergo comprehensive training in their primary domain (e.g., topics 1 through n for levels 101, 201 and 301) as shown in the primary experience view 503, but will only have an overview from the interlocking experiences (e.g., topics 1 and 2 for level 101) as shown in the secondary experience view 505. This extra training will be automated through the previously discussed tagging to achieve a touchless generation of the training plan 501. Interlocks can also occur with other products (e.g., as determined using product dependency information obtained from the product dependency data source 315-6) in the same experience, and a similar dependent training approach is used for that process.

The dependency manager 305 may implement one or more dependency application programming interfaces (APIs) to obtain information about the dependencies, based on the inventory of the integrations for the enterprise, organization or other entity. The dependency APIs will return all the interlocks for a given product at a product level, along with information about the experiences to which they belong. The dependency manager 305 will co-relate the information obtained from the dependency APIs with product taxonomy information (e.g., obtained from the product taxonomy data source 315-2) and the role of the targeted user (e.g., obtained from the reporting hierarchy and roles data source 315-4). This information is then used to create a tag-based query to pull the applicable trainings from the interlocking products for a given user.

The feedback manager 307 is configured to obtain feedback related to training plans and trainings which are performed by different users, and to integrate that feedback for future selection of trainings in future training plans.

The training recommendation engine 309 is configured to collect data from various sources, such as the product hierarchy and tags described above, product taxonomy information (e.g., obtained from the product taxonomy data source 315-2), people hierarchy information (e.g., obtained from the reporting hierarchy and roles data source 315-4), incident data (e.g., obtained from the incidents data source 315-5), previous feedback (e.g., from the feedback manager 307), etc., and uses such information to predict a relevant training path for each team member based on their role within a given product hierarchy. Conventional LMS solutions may create learning paths, but they are often static and manually designed and are thus shaped by the perceptions and biases of the creators and are usually generic (e.g., designed for an entire team or group, rather than being individualized for different team members or other users). The intelligent training portal 301 provides functionality for generating individualized training plans which do not rely solely on generic recommendations, but also looks at the targeted role and the performance of an individual to identify any skill gaps and the breadth of the topics to produce customized learning paths. The skill gaps of an individual (e.g., of a team) may be assessed using incident data (e.g., obtained from the incidents data source 315-5) related to the applications or services that they develop and support. This data provides insights into the root causes of the encountered issues. Also, previous feedback on training courses (e.g., obtained via the feedback manager 307) is considered before making recommendations.

Figure 6A:
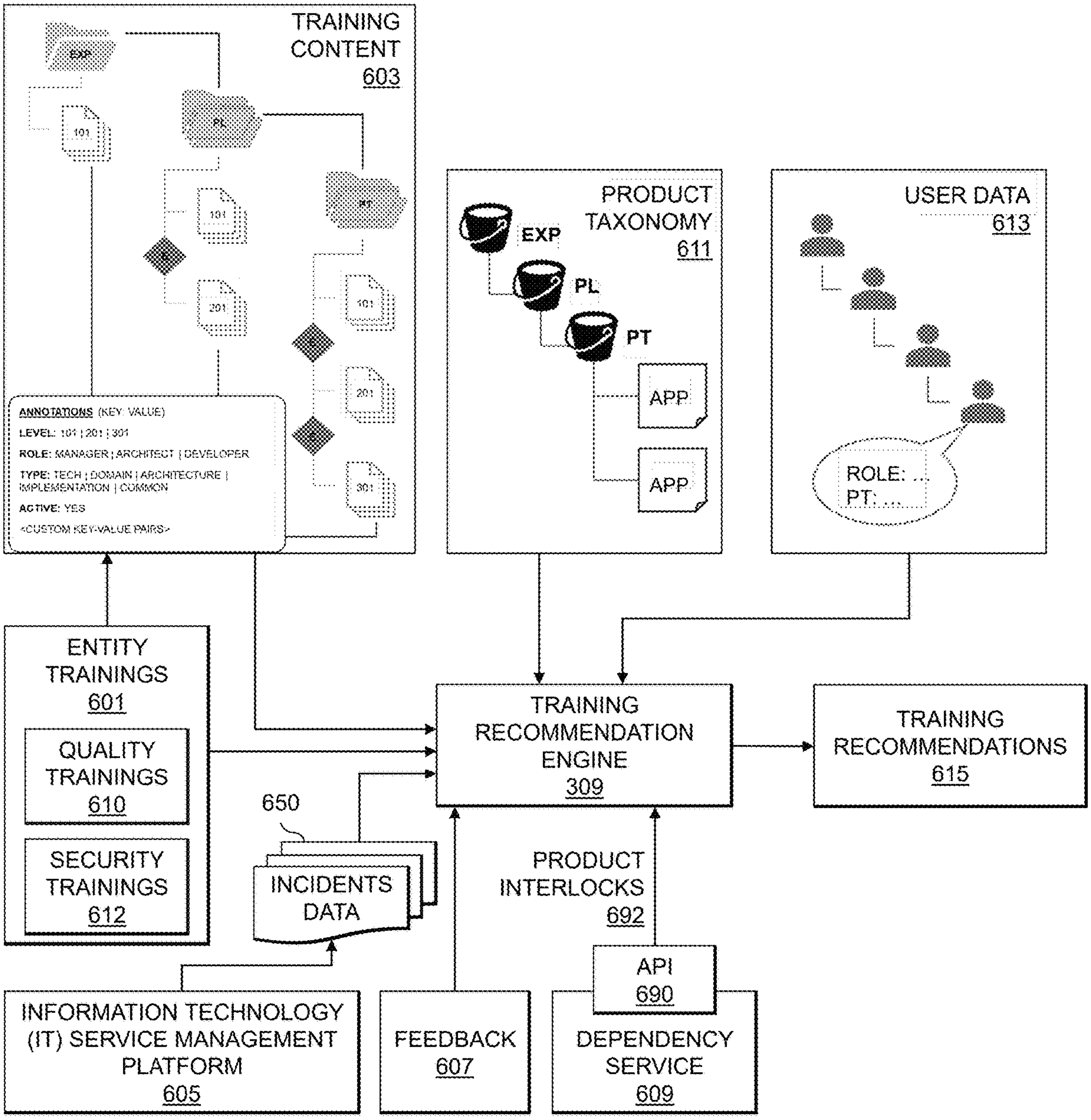

FIGS. 6A and 6B show a system flow which may be implemented using the training recommendation engine 309. As shown in FIG. 6A, the training recommendation engine 309 takes as input entity trainings 601, including quality training 610 and security trainings 612 which are examples of training mandates information (e.g., obtained from the common mandates data source 315-3), as well as training content 603 (e.g., generating based on information obtained from the trainings data source 315-1, as discussed above with respect to FIG. 4). In some cases, the training content 603 is based at least in part on the entity trainings 601. The training recommendation engine 309 further obtains incidents data 650 from an IT service management platform 605 (e.g., an example of the incidents data source 315-5), feedback 607 (e.g., from the feedback manager 307), and product interlocks information 692 obtained from one or more dependency APIs 690 of a dependency service 609 (e.g., dependency manager 305), product taxonomy data 611 (e.g., generated based on information obtained from the product taxonomy data source 315-2), and user data 613 (e.g., generated based on information obtained from the reporting hierarchy and roles data source 315-4). Using this various information, the training recommendation engine 309 generates training recommendations 615. FIG. 6B shows an example 650 of the input and resulting training recommendation output that is part of the generated training recommendations 615. In this example, based on the input (e.g., specification of a product team and role), the output indicates a training plan comprising a set of training courses that such users having the specified product team and role should undertake.

Figure 7A:
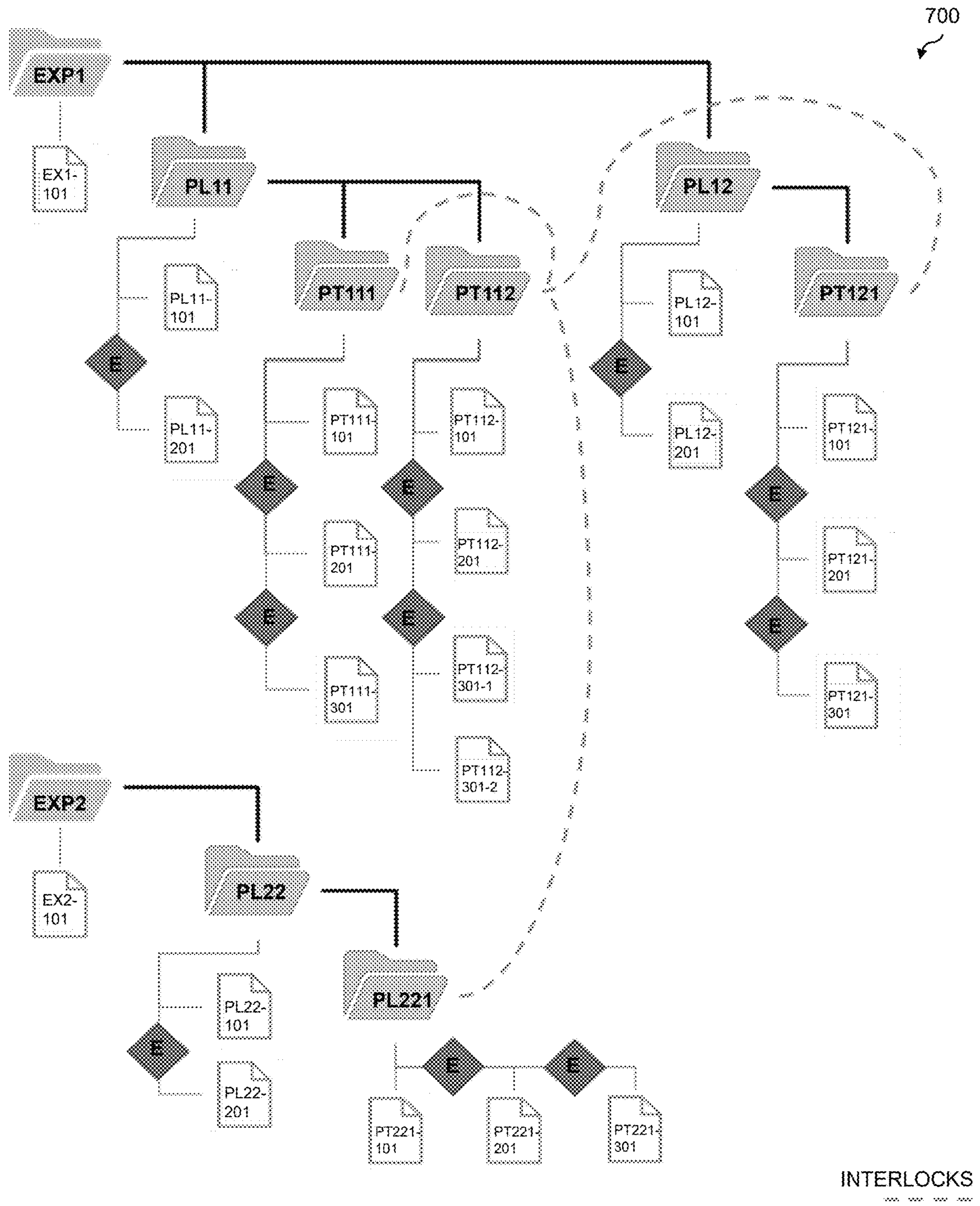

FIGS. 7A and 7B show in more detail the training content hierarchy and tagging leveraged to identify and generate the training recommendations 615 in the example 650. FIG. 7A shows a mapping 700, which is a more detailed version of the mapping 400 described above with additional levels and types, as well as interlocks between the different types (e.g., PT111 and PT112, PT112 and PT121, PT121 and PL221). FIG. 7B shows a table 705 of the training plans for different teams and roles within such teams generated using the mapping 600.

The training recommendation engine 309 is configured to implement a rules engine for driving training plan generation, where the rules engine takes into account product taxonomy, interlocks, user data and tagged training content which are ingested into workflow engines to generate conditional-based training suggestions. NLP is used to identify the relationships between roles, product interlocks and product taxonomy, and to generate queries to fetch the product- and role-specific training plans. The rules engine is further able to generate training plans for reskilling and/or upskilling for the team or individual aspirations of a team member, which may be appended to the earlier derived training plan for that team member. Large language models (LLMs) may be used to identify the training for future skills based on an entity's strategic focus and initiatives. Further, feedback from the feedback manager 307 (e.g., including user self-review) may be given as input to an LLM to suggest the best trainings available, and these trainings may be analyzed for availability, cost, etc. for further approval or perusal. Beyond these hard skills related training courses, the rules engine may also incorporate one or more predefined corporate training courses, driven at the organization level for each role, based on policies, security, culture, etc. Models may be built to identify future trends of the industry, business, security vulnerabilities, etc., and to prescribe at the entity level which can be approved to be added as mandated trainings.

The training recommendation engine 309 is further configured to determine skill deficit-based training plans. While it is important to provide product-based training plans, it is also important to provide contextual training based on the skill deficits of an individual that is impacting their quality of deliverables. Incidents and defects having information like bug details, developer, criticality, customer/component impacted, steps to fix, root cause, etc. The training recommendation engine 309 may use Optical Character Recognition (OCR) techniques to identify key sections of the incidents and defects and to extract the relevant data. This data is used for further analysis (e.g., using a pretrained NLP model), which classifies critical/high risk bugs and prescribes trainings required based on the technology involved. For example, if a bug is related to representational state transfer (REST) services authentication failure which is implemented in Java, the NLP model may identify key terminologies from the bug such as authentication failure, request/response status, Java/jar packages mentioned in the error stack, etc., and classifies details to the closest relevant training material and prescribes "REST API security with Java Spring Boot—What & How" from a set of available training courses. The training recommendation engine 309 may validate whether the suggested training is part of an entity's approved training content and, if so, adds the same to the training plan for the developer.

The progress tracker 311 is configured to track the progress of training plans (e.g., which trainings are completed by different users), and utilizes such information for future updates and modifications to training plans.

The reports and insight generation engine 313 is configured to generate output reports or visualizations related to training plans, the progress of training plans (e.g., as determined by the progress tracker 311), feedback related to training plans (e.g., obtained via the feedback manager 307), etc.

The intelligent training portal 301 is configured to update talent profiles 317 for different users. Updating the talent profiles 317 (e.g., in HR management tools) may be based on the progress of training plans (e.g., as determined using the progress tracker 311) and the successful completion of training by team members. This allows users to monitor their learnings, enables managers to assess their team members' skill profiles, and helps entities to comprehend their talent pool to make recruitment decisions. Additionally, it aids in identifying exciting internal job rotation opportunities. As soon as a training is marked completed in the intelligent training portal 301 by finishing the available evaluation successfully, the intelligent training portal 301 will invoke one or more APIs or other published integration models to update associated team members' talent profiles 317 with the new skills acquired. Updating the talent profiles 317 is not a static operation, as merely completing a training course does not guarantee skill acquisition. Real progress is evident in reduced defects, quicker deliveries, and smoother integration with other teams. The feedback manager 307 may provide effective feedback to managers about team members, and updates proficiency levels in their talent profiles 317 accordingly using such information.

The technical solutions described herein provide tools that map a team's priorities and objectives against an individual team member's personal interests and role needs to derive customized training plans, and provide real-time feedback about the effectiveness of trainings by evaluating the real-time impact of technical training. Further, the technical solutions described herein are able to correlate and analyze all the training related to a product and its dependent products from disparate systems to enable a comprehensive training plan for each role, and to derive additional insights (e.g., using NLP and ML techniques). The technical solutions described herein are also able to promote a sense of community learning by sensitizing about the needs of the dependent domains leading to reduced friction between teams. The technical solutions described herein are also able to provide diverse training content (e.g., videos, text-based, recordings, etc.) to create training plans, and provide for real-time tracking and updating of team members' skill or talent profiles based on the training progress and validation, helping entities to keep their overall skill profile up-to-date.

Advantageously, the technical solutions described herein provide a data-driven approach to identify areas of improvement for users, and can provide personalized training recommendations based on individual needs. Further, the technical solutions described herein can integrate with other systems (e.g., HR systems), allowing for the collection and analysis of data from various sources. This integrated approach supports the data-driven approach in pinpointing areas for improvement and enables tailored training recommendations. Through gathering, analyzing and integrating data from different sources, data management plays an important role. Further technical advantages are provided through enabling a single portal to provide a consolidated learning path for the team that leverages the actual content from various learning platforms, and which is continuously adjusted to incorporate latest updates. Additional technical advantages include the ability to provide data-driven identification of the training areas for individual users based on their performance in day-to-day deliverables, and the ability to continuously track the effectiveness of trainings based on the performance of the participants post training. Still further, frictionless development of interlocks between applications as product teams impart relevant learnings across all the interlocking applications advantageously provides for a more holistic understanding of the process.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for machine learning-based training management will now be described in greater detail with reference to FIGS. 8 and 9. Although described in the context of system 100, these platforms may also be used to implement at least portions of other information processing systems in other embodiments.

Figure 8:
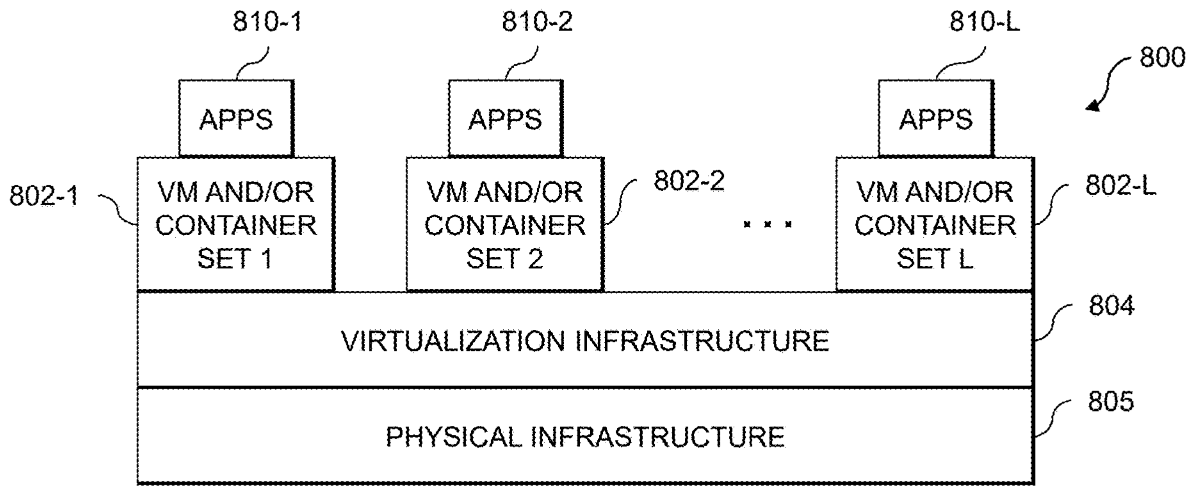
FIGS. 8 and 9 show examples of processing platforms that may be utilized to implement at least a portion of an information processing system in illustrative embodiments.
Figure 9:
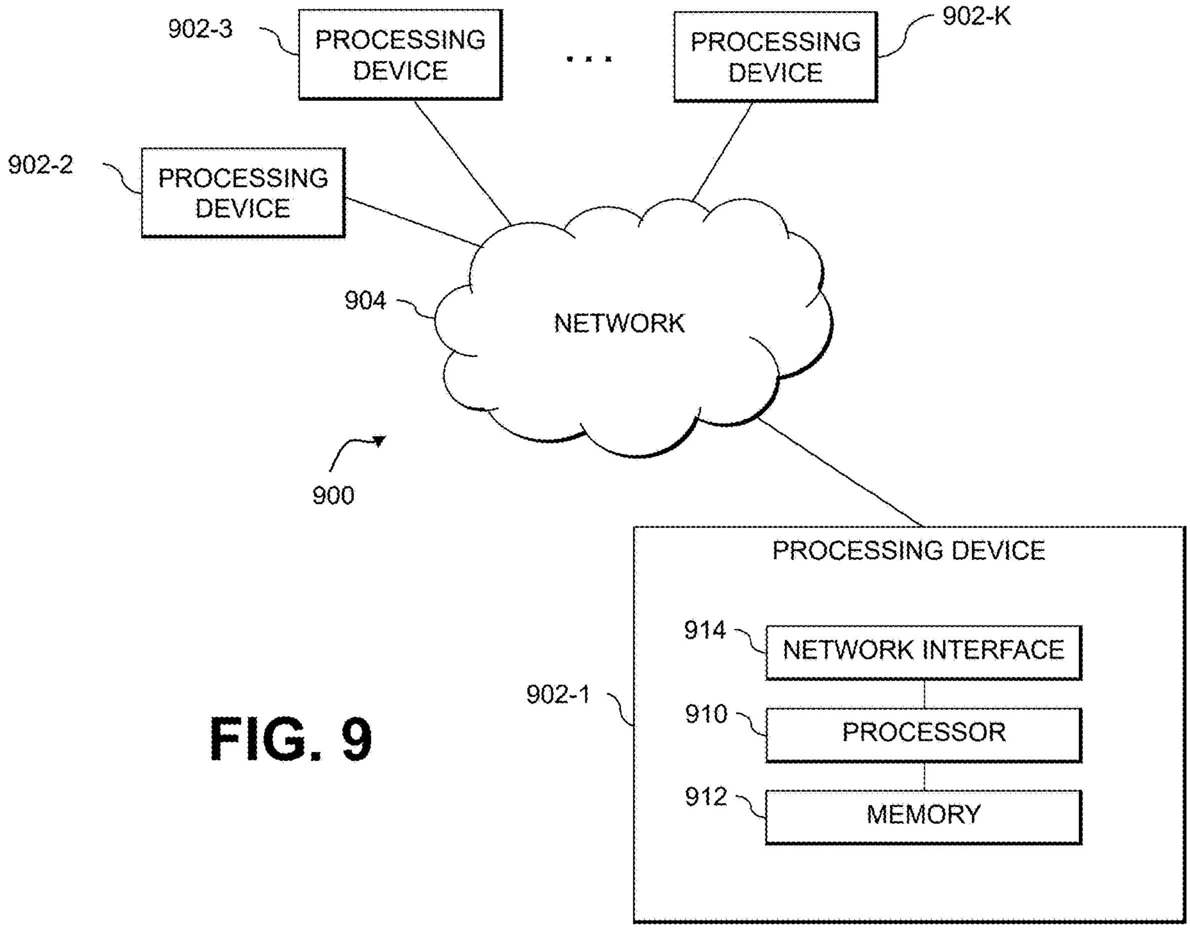

FIG. 8 shows an example processing platform comprising cloud infrastructure 800. The cloud infrastructure 800 comprises a combination of physical and virtual processing resources that may be utilized to implement at least a portion of the information processing system 100 in FIG. 1. The cloud infrastructure 800 comprises multiple virtual machines (VMs) and/or container sets 802-1, 802-2, . . . 802-L implemented using virtualization infrastructure 804. The virtualization infrastructure 804 runs on physical infrastructure 805, and illustratively comprises one or more hypervisors and/or operating system level virtualization infrastructure. The operating system level virtualization infrastructure illustratively comprises kernel control groups of a Linux operating system or other type of operating system.

The cloud infrastructure 800 further comprises sets of applications 810-1, 810-2, . . . 810-L running on respective ones of the VMs/container sets 802-1, 802-2, . . . 802-L under the control of the virtualization infrastructure 804. The VMs/container sets 802 may comprise respective VMs, respective sets of one or more containers, or respective sets of one or more containers running in VMs.

In some implementations of the FIG. 8 embodiment, the VMs/container sets 802 comprise respective VMs implemented using virtualization infrastructure 804 that comprises at least one hypervisor. A hypervisor platform may be used to implement a hypervisor within the virtualization infrastructure 804, where the hypervisor platform has an associated virtual infrastructure management system. The underlying physical machines may comprise one or more distributed processing platforms that include one or more storage systems.

In other implementations of the FIG. 8 embodiment, the VMs/container sets 802 comprise respective containers implemented using virtualization infrastructure 804 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 800 shown in FIG. 8 may represent at least a portion of one processing platform. Another example of such a processing platform is processing platform 900 shown in FIG. 9.

The processing platform 900 in this embodiment comprises a portion of system 100 and includes a plurality of processing devices, denoted 902-1, 902-2, 902-3, . . . 902-K, which communicate with one another over a network 904.

The network 904 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 902-1 in the processing platform 900 comprises a processor 910 coupled to a memory 912.

The processor 910 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 912 may comprise random access memory (RAM), read-only memory (ROM), flash memory or other types of memory, in any combination. The memory 912 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 902-1 is network interface circuitry 914, which is used to interface the processing device with the network 904 and other system components, and may comprise conventional transceivers.

The other processing devices 902 of the processing platform 900 are assumed to be configured in a manner similar to that shown for processing device 902-1 in the figure.

Again, the particular processing platform 900 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for machine learning-based training management as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, IT assets, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:

at least one processing device comprising a processor coupled to a memory;

the at least one processing device being configured:

to generate a first data structure characterizing interdependencies between a first and one or more additional applications developed by a given entity;

to generate a second data structure characterizing mappings between the first and one or more additional applications and a training hierarchy comprising a plurality of trainings, the training hierarchy comprising multiple levels, the multiple levels including at least a first level associated with independently deployable ones of the first and one or more additional applications providing respective products offered by the given entity, a second level associated with first logical groupings of two or more of the independently deployable ones of the first and one or more additional applications providing a product line of related products offered by the given entity, and a third level associated with second logical groupings of two or more of the first logical groupings associated with two or more related product lines of related products offered by the given entity, wherein generating the second data structure comprises utilizing one or more dependency application programming interfaces to determine first interdependencies between the first logical groupings and second interdependencies between the second logical groupings;

to identify a given user that is part of a group of two or more users responsible for development of the first application, the given user being associated with a given user role within the group of two or more users;

to generate, utilizing one or more machine learning models that take as input the given user role of the given user and at least portions of the first data structure and the second data structure, a training plan for the given user, the training plan specifying a subset of the plurality of trainings to be completed by the given user, the subset of the plurality of trainings comprising (i) a first set of one or more trainings from the first, second and third levels of the training hierarchy which are mapped to the first application, (ii) a second set of one or more trainings from at least one of the second and third levels of the training hierarchy which are mapped to at least one of a first subset of the first logical groupings that include the first application and a second subset of the second logical groupings that include one or more of the first subset of the first logical groupings, and (iii) a third set of one or more trainings from at least one of the second and third levels of the training hierarchy which are mapped to at least one logical grouping in the first logical groupings having determined first interdependencies with the first subset of the first logical groupings that include the first application and at least one logical grouping in the second logical groupings having determined second interdependencies with the second subset of the second logical groupings;

to track a progress of the given user for different ones of the subset of the plurality of trainings included in the generated training plan; and to dynamically update a user profile associated with the given user based at least in part on the tracked progress of the given user.

2. The apparatus of claim 1 wherein generating the training plan for the given user is further based at least in part on one or more initiatives of the given entity.

3. The apparatus of claim 2 wherein the one or more initiatives of the given entity are determined based at least in part utilizing a large language model that takes as input a textual description of the one or more initiatives of the given entity and the plurality of trainings.

4. The apparatus of claim 1 wherein generating the training plan for the given user is further based at least in part on one or more training mandates associated with at least one of the given entity and the given user role.

5. The apparatus of claim 1 wherein the at least one processing device is further configured to determine one or more skill gaps of the given user based at least in part on monitoring incident data associated with the first application and the given user, wherein generating the training plan for the given user is further based at least in part on the determined one or more skill gaps of the given user.

6. The apparatus of claim 5 wherein monitoring the incident data associated with the first application and the given user is based at least in part on utilizing a natural language processing machine learning model to determine a mapping between textual descriptions of the incident data and one or more of the plurality of trainings.

7. The apparatus of claim 1 wherein the at least one processing device is further configured to determine a balance of two or more different types of skills for a plurality of users associated with the given entity, wherein generating the training plan for the given user is further based at least in part on the determined balance of the two or more different types of skills for the plurality of users associated with the given entity.

8. The apparatus of claim 1 wherein dynamically updating the user profile of the given user is further based at least in part on user feedback of one or more additional users associated with the given entity responsible for managing the given user.

9. The apparatus of claim 1 wherein dynamically updating the user profile of the given user is further based at least in part on monitoring incident data associated with the first application and the given user subsequent to completion of different ones of the subset of the plurality of trainings included in the generated training plan by the given user.

10. The apparatus of claim 1 wherein dynamically updating the user profile of the given user is further based at least in part on tracking a number of defects associated with the first application.

11. The apparatus of claim 1 wherein dynamically updating the user profile of the given user is further based at least in part on tracking a delivery time for code updates to the first application authored by the given user.

12. The apparatus of claim 1 wherein the second logical groupings of the third level are associated with different technology domains, and the first logical groupings of the second level are associated with groups of applications within each of the different technology domains.

13. A computer program product comprising a non-transitory processor-readable storage medium having stored therein program code of one or more software programs, wherein the program code when executed by at least one processing device causes the at least one processing device:

to generate a first data structure characterizing interdependencies between a first and one or more additional applications developed by a given entity;

to generate a second data structure characterizing mappings between the first and one or more additional applications and a training hierarchy comprising a plurality of trainings, the training hierarchy comprising multiple levels, the multiple levels including at least a first level associated with independently deployable ones of the first and one or more additional applications providing respective products offered by the given entity, a second level associated with first logical groupings of two or more of the independently deployable ones of the first and one or more additional applications providing a product line of related products offered by the given entity, and a third level associated with second logical groupings of two or more of the first logical groupings associated with two or more related product lines of related products offered by the given entity, wherein generating the second data structure comprises utilizing one or more dependency application programming interfaces to determine first interdependencies between the first logical groupings and second interdependencies between the second logical groupings;

to identify a given user that is part of a group of two or more users responsible for development of the first application, the given user being associated with a given user role within the group of two or more users;

to generate, utilizing one or more machine learning models that take as input the given user role of the given user and at least portions of the first data structure and the second data structure, a training plan for the given user, the training plan specifying a subset of the plurality of trainings to be completed by the given user, the subset of the plurality of trainings comprising (i) a first set of one or more trainings from the first, second and third levels of the training hierarchy which are mapped to the first application, (ii) a second set of one or more trainings from at least one of the second and third levels of the training hierarchy which are mapped to at least one of a first subset of the first logical groupings that include the first application and a second subset of the second logical groupings that include one or more of the first subset of the first logical groupings, and (iii) a third set of one or more trainings from at least one of the second and third levels of the training hierarchy which are mapped to at least one logical grouping in the first logical groupings having determined first interdependencies with the first subset of the first logical groupings that include the first application and at least one logical grouping in the second logical groupings having determined second interdependencies with the second subset of the second logical groupings;

to track a progress of the given user for different ones of the subset of the plurality of trainings included in the generated training plan; and to dynamically update a user profile associated with the given user based at least in part on the tracked progress of the given user.

14. The computer program product of claim 13 wherein the program code when executed by the at least one processing device further causes the at least one processing device to determine one or more skill gaps of the given user based at least in part on monitoring incident data associated with the first application and the given user, and wherein generating the training plan for the given user is further based at least in part on the determined one or more skill gaps of the given user.

15. The computer program product of claim 13 wherein the program code when executed by the at least one processing device further causes the at least one processing device to determine a balance of two or more different types of skills for a plurality of users associated with the given entity, and wherein generating the training plan for the given user is further based at least in part on the determined balance of the two or more different types of skills for the plurality of users associated with the given entity.

16. The computer program product of claim 13 wherein the second logical groupings of the third level are associated with different technology domains, and the first logical groupings of the second level are associated with groups of applications within each of the different technology domains.

17. A method comprising:

generating a first data structure characterizing interdependencies between a first and one or more additional applications developed by a given entity;

generating a second data structure characterizing mappings between the first and one or more additional applications and a training hierarchy comprising a plurality of trainings, the training hierarchy comprising multiple levels, the multiple levels including at least a first level associated with independently deployable ones of the first and one or more additional applications providing respective products offered by the given entity, a second level associated with first logical groupings of two or more of the independently deployable ones of the first and one or more additional applications providing a product line of related products offered by the given entity, and a third level associated with second logical groupings of two or more of the first logical groupings associated with two or more related product lines of related products offered by the given entity, wherein generating the second data structure comprises utilizing one or more dependency application programming interfaces to determine first interdependencies between the first logical groupings and second interdependencies between the second logical groupings;

identifying a given user that is part of a group of two or more users responsible for development of the first application, the given user being associated with a given user role within the group of two or more users;

generating, utilizing one or more machine learning models that take as input the given user role of the given user and at least portions of the first data structure and the second data structure, a training plan for the given user, the training plan specifying a subset of the plurality of trainings to be completed by the given user, the subset of the plurality of trainings comprising (i) a first set of one or more trainings from the first, second and third levels of the training hierarchy which are mapped to the first application, (ii) a second set of one or more trainings from at least one of the second and third levels of the training hierarchy which are mapped to at least one of a first subset of the first logical groupings that include the first application and a second subset of the second logical groupings that include one or more of the first subset of the first logical groupings, and (iii) a third set of one or more trainings from at least one of the second and third levels of the training hierarchy which are mapped to at least one logical grouping in the first logical groupings having determined first interdependencies with the first subset of the first logical groupings that include the first application and at least one logical grouping in the second logical groupings having determined second interdependencies with the second subset of the second logical groupings;

tracking a progress of the given user for different ones of the subset of the plurality of trainings included in the generated training plan; and dynamically updating a user profile associated with the given user based at least in part on the tracked progress of the given user;

wherein the method is performed by at least one processing device comprising a processor coupled to a memory.

18. The method of claim 17 further comprising determining one or more skill gaps of the given user based at least in part on monitoring incident data associated with the first application and the given user, wherein generating the training plan for the given user is further based at least in part on the determined one or more skill gaps of the given user.

19. The method of claim 17 further comprising determining a balance of two or more different types of skills for a plurality of users associated with the given entity, and wherein generating the training plan for the given user is further based at least in part on the determined balance of the two or more different types of skills for the plurality of users associated with the given entity.

20. The method of claim 17 wherein the second logical groupings of the third level are associated with different technology domains, and the first logical groupings of the second level are associated with groups of applications within each of the different technology domains.

* * * * *